(12) United States Patent
Cross, Jr. et al.

(10) Patent No.: US 8,296,149 B2
(45) Date of Patent: *Oct. 23, 2012

(54) SYSTEMS AND METHODS FOR INPUTTING GRAPHICAL DATA INTO A GRAPHICAL INPUT FIELD

(75) Inventors: Charles W. Cross, Jr., Wellington, FL (US); David Jaramillo, Lake Worth, FL (US); Marc White, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 938 days.

This patent is subject to a terminal disclaimer.

(21) Appl. No.: 12/363,580

(22) Filed: Jan. 30, 2009

(65) Prior Publication Data
US 2009/0199101 A1    Aug. 6, 2009

Related U.S. Application Data

(63) Continuation of application No. 10/945,119, filed on Sep. 20, 2004, now Pat. No. 7,509,260.

(51) Int. Cl.
*G10L 15/22* (2006.01)
(52) U.S. Cl. .................................. 704/270.1
(58) Field of Classification Search ................. 704/270.1
See application file for complete search history.

(56) References Cited

U.S. PATENT DOCUMENTS

| | | | |
|---|---|---|---|
| 5,509,087 A | 4/1996 | Nagamine | |
| 6,282,511 B1 | 8/2001 | Mayer | |
| 6,496,799 B1 | 12/2002 | Pickering | |
| 6,766,370 B2 | 7/2004 | Glommen et al. | |
| 6,957,009 B1 | 10/2005 | De Haan | |
| 7,030,890 B1 | 4/2006 | Jouet et al. | |
| 7,050,056 B2 | 5/2006 | Meyringer | |
| 7,120,870 B1 | 10/2006 | Nakamura | |
| 7,293,279 B1 | 11/2007 | Asmussen | |
| 7,356,472 B2 | 4/2008 | Cross et al. | |
| 7,509,260 B2 * | 3/2009 | Cross et al. | ................. 704/270.1 |
| 7,920,681 B2 * | 4/2011 | Agapi et al. | ................ 379/88.16 |
| 2002/0140714 A1 | 10/2002 | Hoffman | |
| 2003/0014261 A1 | 1/2003 | Kageyama | |
| 2003/0216917 A1 | 11/2003 | Sakunaga et al. | |
| 2004/0006476 A1 | 1/2004 | Chiu | |

OTHER PUBLICATIONS

Search Report for Taiwan Invention Patent Application No. 094131173/BOC920040043TW1.

* cited by examiner

*Primary Examiner* — Susan McFadden
(74) *Attorney, Agent, or Firm* — Novak Druce + Quigg LLP

(57) ABSTRACT

A system (20) for inputting graphical data into a graphical input field includes a graphical input device (22) for inputting the graphical data into the graphical input field, and a processor-executable voice-form module (28) responsive to an initial presentation of graphical data to the graphical input device. The voice-form module (28) causes a determination of whether the inputting of the graphical data into the graphical input field is complete. A method for inputting graphical data into a graphical input field includes initiating an input of graphical data via a graphical input device into the graphical input field, and actuating a voice-form module in response to initiating the input of graphical data into the graphical input field.

11 Claims, 5 Drawing Sheets

SYSTEMS AND METHODS FOR INPUTTING GRAPHICAL DATA INTO A GRAPHICAL INPUT FIELD

CROSS REFERENCE TO RELATED APPLICATIONS

This application is a continuation of, and accordingly claims the benefit of, U.S. patent application Ser. No. 10/945,119, filed with the U.S. Patent and Trademark Office on Sep. 20, 2004, now U.S. Pat. No. 7,509,260, the disclosure of which is hereby incorporated by reference in its entirety.

BACKGROUND

1. Field of the Invention

The present invention relates to data processing and communication systems and, more particularly, to inputting data in a data processing or communication system.

2. Description of the Related Art

Recent developments, many founded on the data-description eXtensible Markup Language (XML), have given rise to new Web-based applications including multimodal interfaces or browsers. A multimodal browser allows a user to access multimodal content, content that can be both graphical and audible. Traditionally, the user accessed Web content utilizing graphic input from a keyboard or manually directed screen-pointer entry. Later, the user was able to utilize speech input. More recently, the user has been able to access Web content through multimodal interfaces, which permit the use of both graphic and speech inputs.

One type of multimodal browser is provided by the extensible Hypertext Markup Language (XHTML)+Voice, also denoted more succinctly as the X+V markup language. The X+V markup language extends the traditional graphic browser to include spoken interactions. The X+V markup language integrates XHTML, XML Events, and VoiceXML, developed as part of the World Wide Web Consortium (W3C) Speech Interface Framework. The integration includes voice modules that support speech synthesis, speech dialogs, command and control applications, and speech grammars. Voice handlers can be attached to XHTML elements and respond to specific Document Object Model (DOM) events of a visual browser.

By enabling a voice-based interface along with more conventional interfaces to the Web, the X+V markup language has helped expand the reach of the Internet to more devices than just personal computers. On expansion has been in the area of industrial handheld devices which, using the X+V markup language, combine speech recognition and Web browsing to provide input and output (I/O) devices that can be operated without manual keyed-in data entry. These so-called hands-free devices include non-traditional I/O capabilities such as those provided, for example, by barcode scanners.

The extension of a multimodal interface to industrial handheld devices, however, has been hampered by the lack an effective and efficient way of entering data or editing entered data with such devices. This is due to the fact that, with most such devices, it is difficult to determine when data has been entered unless and until a user manually taps out of a data input field.

SUMMARY OF THE INVENTION

The present invention provides systems and methods for automatically detecting when the inputting of graphical data into a graphical input field via a graphical input device has been completed. The system and methods provided can also determine whether the graphical data inputted into the graphical input field are valid.

A system according to the present invention can include a graphical input device for inputting the graphical data into the graphical input field, and a processor-executable voice-form module responsive to an initial presentation graphical data to the graphical input device. The voice-form module can cause a determination of whether the inputting of the graphical data into the graphical input field is complete.

A method for inputting graphical data into a graphical input field can include initiating an input of graphical data via a graphical input device into the graphical input field, and actuating a voice-form module in response to initiating the input of graphical data into the graphical input field for causing a determination of whether the input of graphical data into the graphical input field is complete.

Actuating the voice-form module, moreover, can include actuating a first voice-form function for capturing an initial value corresponding to the graphical input field. The first voice-form function can subsequently initiate a timing function for polling the graphical input field at a predefined time. The polling at discrete intervals can be used to determine at least one subsequent value corresponding to the graphical input field. Actuating the voice-form module can further include actuating a second voice-form function based upon a final value corresponding to the graphical input field. The second voice-form function can cause a determination of whether the final value corresponding to the graphical input field is contained within a predefined set of valid values.

BRIEF SUMMARY OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention provides a system for inputting graphical data into a graphical input field such as the input field of a Web document written in a markup language such as HTML. The system automatically detects the completion of the process of inputting graphical data into the graphical input field via a graphical input device such as a scanner, a keyboard, or a combination device comprising a manually directed pointer and graphical user interface (GUI). Additionally, the system determines whether the inputted data is valid data according to a predefined criteria. The system also can prompt a user to re-present the graphical data to the graphical input device if the graphical data initially presented is determined to be invalid after the graphical data has been inputted into the graphical input field.

As used herein, the phrase graphical data denotes computer-readable data including text as well as visual objects other than text. Accordingly, the phrase graphical data also includes graphics, text not stored as ASCII characters, and program code presented using binary numbers or alphanumeric characters. The phrase further includes, for example, barcode representations that can be read-in to a data processing system via a barcode scanner. Thus, usage of the phrase graphical data is intended to include data distinct from voice-based data.

Figure 1:
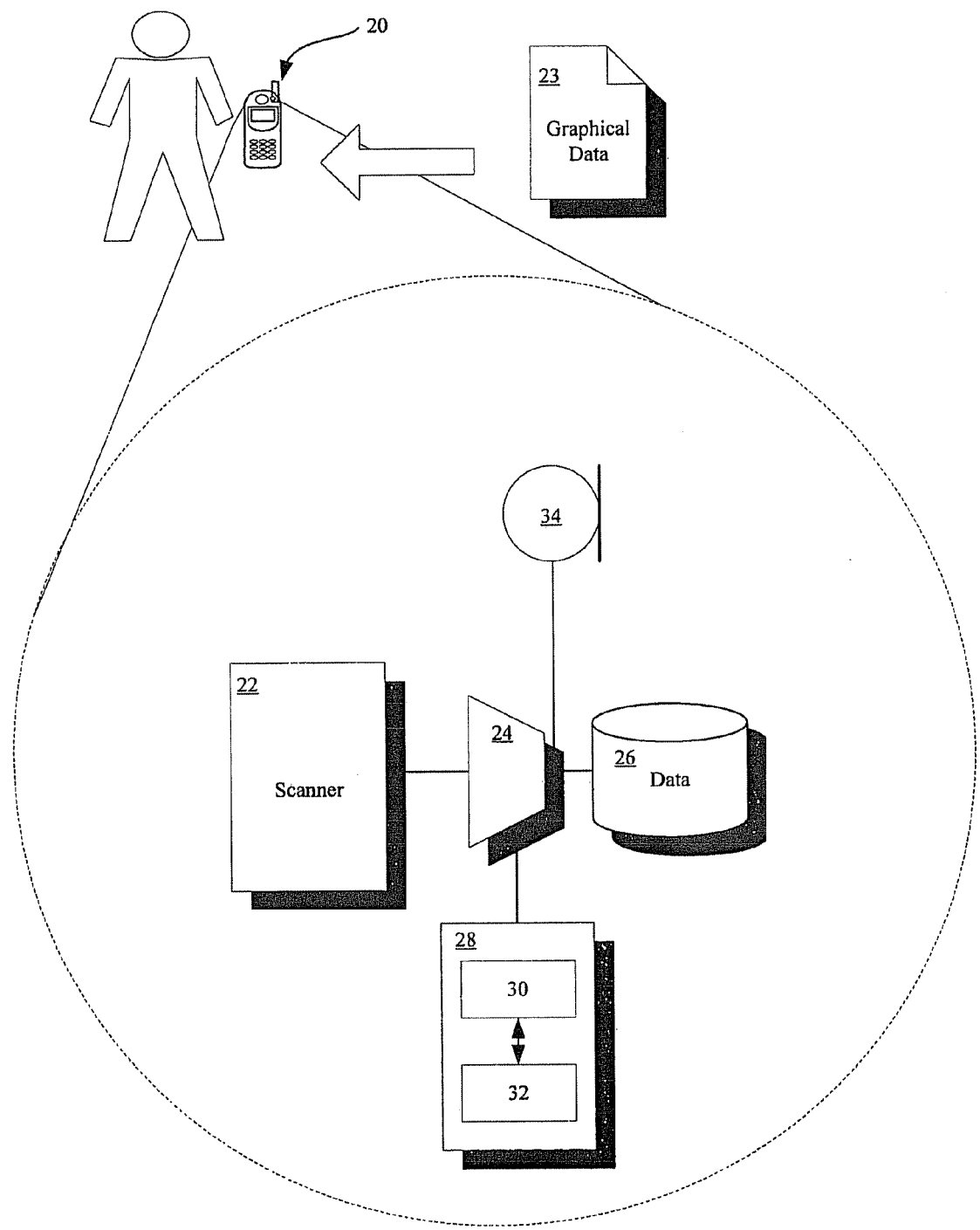
FIG. 1 is a schematic diagram of a system for inputting graphical data into a graphical input field according to the present invention.

FIG. 1 is a schematic diagram of a system 20 according to one embodiment of the present invention. The system 20 is illustratively embodied in a hand-held device that can be hand carried as the user performs certain tasks described in more detail below. The system 20 includes a graphical input device 22. The graphical input device 22 is illustratively a scanner that scans, or read-ins, a document 23 containing graphical data. Such graphical data, for example, can be barcode data that conveys different types of information. The graphical input device 22 can also receive electronically encoded information, such as information available through radio frequency identification (RFID) tags, smart chips, magnetized strips containing information, and the like. The information received by the device 22 can be used for maintaining an inventory, monitoring sales or purchases, keeping track of critical components, or for any of a host of other functions that can be efficiently and effectively performed by reading data into an electronic database.

The scanner alternately can be a stand-alone device, or, instead, it can be an integrated portion of a data processing or communication system other than the illustrated hand-held device. The graphical input device 22 can be, for example, a keyboard or a similar array of data-entry keys of a cell phone or personal digital assistant (PDA). The graphical input device 22 can also comprise a combination comprising a visual scanner as well as an array of data-entry keys.

The system 20 also includes a processor 24 connected to the graphical input device 22. As will be readily understood by those of ordinary skill in the art, the processor 24 can receive electrical signals from the graphical input device 22 and derive from the signals corresponding data representations such as various length codewords. The processor 24 alternately can be a general purpose computer or a specific-application device other than the illustrated hand-held device. The processor 24 can include one or more logic gates or other data processing circuitry, as will also be readily understood by those of ordinary skill in the art.

The data representations derived by the processor 24 from the signals produced by the graphical input device 22 form the graphical data that is input into a graphical input field of a stored electronic document. Accordingly, the system 20 further includes a memory 26 for storing electronic documents containing graphical input fields. As already noted, a graphical input field can be, for example, the input field of Web document written in a markup language such as HTML.

The determination of when the inputting of the graphical data into a graphical input field has been completed is accomplished by the inclusion in the system 20 of a voice-form module 28. The voice-form module 28 is actuated in response to an initial input of graphical data into the graphical input field. According to one embodiment of the invention, the voice-form module 28 causes a determination of whether the input of graphical data into the graphical input field is complete by assessing changes in the value of the graphical input field. This is done using a polling technique, wherein the voice-form module 28 intermittently queries the value of the graphical input field. As graphical data is input into the graphical input field, the corresponding value changes. When the input is complete, the value of the graphical input field ceases to change. By intermittently detecting the value of the graphical input field, the voice-form module 28 is able detect when this value has stopped changing and thus when the input has been completed.

Figure 2:
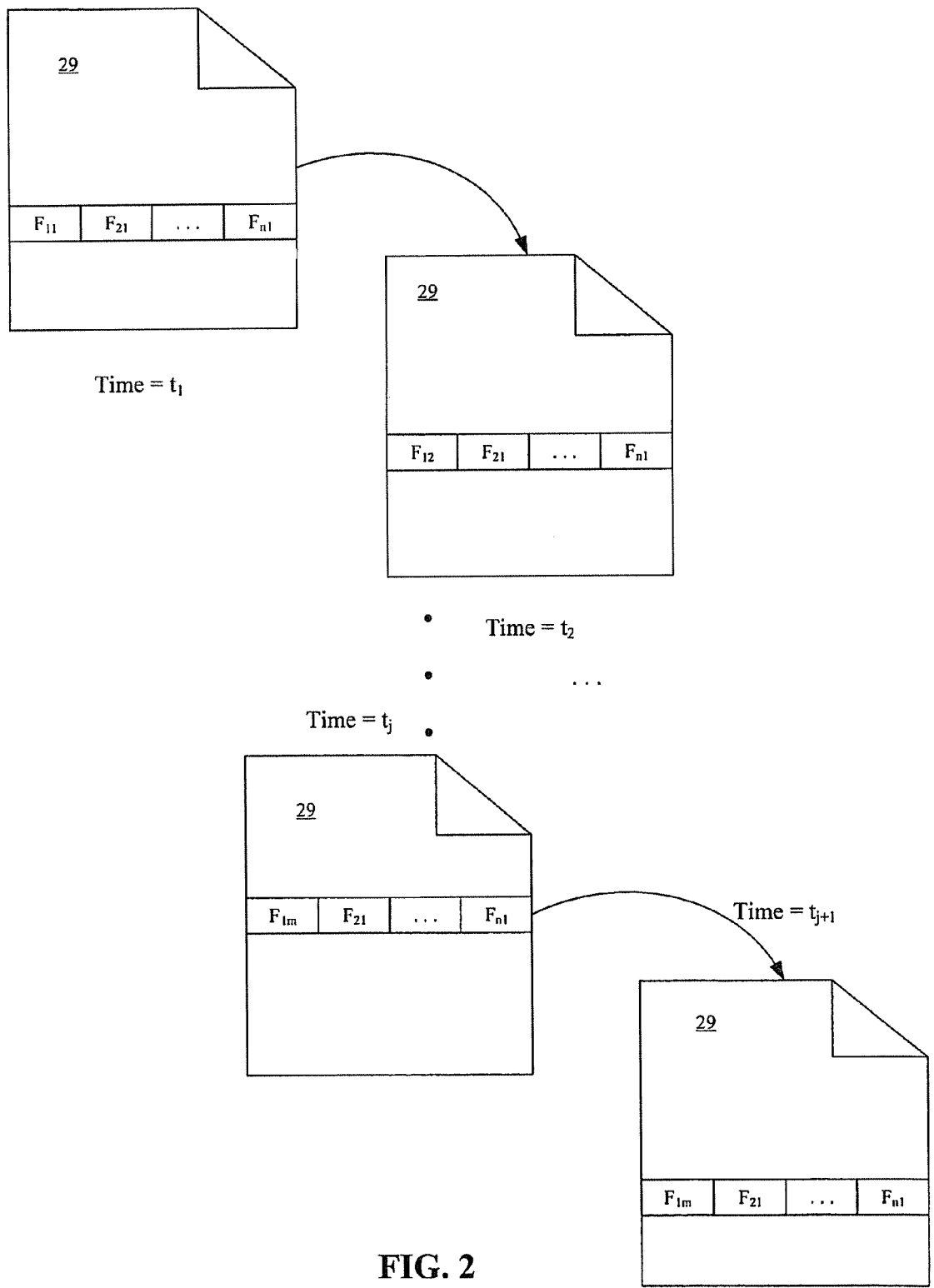
FIG. 2 is a schematic diagram of operative features of the system of FIG. 1.

FIG. 2 is a schematic diagram of a representative document 29 having n graphical input fields, the corresponding values of which are $F_{1i}, F_{2i}, \ldots, F_{ni}$. The initial value of the first graphical input field is $F_{11}$ at time $t_1$. The value of the first graphical input field changes to $F_{12}$ at time $t_2$ as graphical data is being input. At time tj, the final value of the first graphical input field of the representative document 29 is $F_{1j}$. The value is unchanged over the subsequent interval. Accordingly, $F_{1j}=F_{1j+1}$. The system 20 interprets this as an indication that the input of graphical data into the graphical input field is complete. Accordingly, the system 20 moves to the next field, if additional graphical input fields remain to be filled.

According to one embodiment, the voice-form module 28 illustratively includes first and second voice-form functions 30, 32. In operation, the first voice-form function is actuated by a voice-form call (not shown). The first voice-form function captures the initial value $F_{11}$ of the graphical input field at time $t_1$, and initiates a timing function (not shown) that polls the graphical input field at a predefined time interval. The predefined time interval can be chosen to be of any duration. For example, the timer function can poll the input field at time intervals of 500 milliseconds. When a change in the value corresponding to the input field is detected after a 500 millisecond interval has elapsed, it is assumed that changing value indicates that graphical data is still being inputted. When no change is detected after an elapse of 500 milliseconds, it is assumed that the input of graphical data is complete.

Optionally, the voice-form module 28 includes a second voice-form function 32 actuated by the first voice form-function 30. The second voice-form function 32 causes a determination of whether the final value corresponding to the graphical input field is contained within a predefined set of valid values. If the final value is not within the predefined set of valid values, the second voice-form function 32 causes the corresponding graphical input field to be cleared. The system 20 can then continue the process of inputting graphical data, including inputting data into any remaining graphical input fields that are to be filled with graphical data. In some instances, graphical data may be determined to be invalid when in fact it is not. This can occur, for example, if the data is improperly inputted. Therefore, the voice-form module optionally causes the system 20 to prompt the user to re-input the graphical data initially determined to be invalid. Accordingly, the system 20 optionally includes a text-to-speech (TTS) processor coupled to a voice transducer 34 for communicating the prompt to a user.

The voice-form module 28 is illustratively implemented as a set of software-based instructions that can be stored in the memory 26 and processed by the processor 24 for accomplishing the functions described. Preferably, the instructions are implemented using a scripting language, or scripts. Scripts is a type of computer code that can be directly executed by a program that understands the language in which the script is written. Scripts do not need to be compiled into object code to be executed. Many if not most Web sites use scripts to construct relatively small, self-contained, programs embedded in a Web page's data. Well-known scripting languages include, for example, Javascript, ECMAscript, and VBscript.

the input field for a valid barcode. If one is found, then the second voice-form function exits normally. If not, then it sets a flag which indicates that the process needs to be re-initiated:

```
<script type="text/javascript">
    var initialInput2Value;
    var lastInput2Value;
    var timerID;
    function startInput2Timer( )
    {
        initalInput2Value = document.getElementByID('scanner_input_2').value;
        timerID = set setInterval('input2Timer( )', 500);
    }
    function input2Timer( )
    {
        var curInput2Value = document.getElementById('scanner_input_2').value:
        if (curInput2Value ! = initialInput2Value)
        {
            if (curInput2Value = = initialInput2Value
            {
                clearInterval(timerID);
                document.getElementById('scanner_input_hidden').focus(
);
            }
            lastInput2Value = curInput2Value;
        }
    }
</script>
```

The following is a set of representative script-based instructions for implementing the voice-form module 28. The system 20, and the voice-form functions 30 and 32 of the voice-form module 28 in particular, are illustratively configured according to these same instructions to read-in graphical data in the form of a barcode. As already described, the first voice-form function 30 implemented by the instructions stores the current value of a graphical input field and initiates the timing function. Once, the value of the input field has been determined to have changed, the timing function continues to intermittently poll the graphical input field until the value stops changing. This helps ensure that the optional validity check, illustratively implemented using a barcode lookup table, is not actuated while the graphical data is being scanned in and entered into the graphical input field. The first instructions simply output a TTS prompt instructing the user to scan a barcode:

```
<vxml:form id=scannerform_focus>
    <vxml:block>
        Please scan in bar code.
        <vxml:assign name="input2Started"=expr="true"/>
        <vxml:value expr="startInput2Timer( )"/>
    </vxml:block>
</vxml:form>
```

As reflected in the remaining portions of the scripts code, below, it is sometimes advisable to use a hidden input field rather than a visible text input item. This helps ensure the user does not alter the contents of a graphical input field inadvertently. Thus, as illustrated in the representative script instructions following, the voice-module 28 sets the focus to a hidden input field denoted "scanner_input_hidden once it has determined that a user has initiated the input of graphical data in the form of a barcode. As the following script instructions show, this in turn actuates the second voice-form function denoted "scannerform_script_hidden_focus," which queries the input field for a valid barcode. If one is found, then the second voice-form function exits normally. If not, then it sets a flag which indicates that the process needs to be re-initiated:

For the sake of illustration, the voice form used herein looks up a barcode from a simulated database. If the scanned code is valid, then the voice form exits as normal. Otherwise, as illustrated, the user is prompted to re-input graphical data by scanning again:

```
<vxml:form id = "scanner_script_hidden_focus">
    <vxml:block>
        <vxml:if cond = "input2Started = = false">
            <vxml:return/>
        <vxml:if
    </vxml:block>
    <vxml:block/>
        <vxml:assign name = "input2Started"expr = "false"/>
        <vxml:var            name            =
"barcodeTitle"expr="lookupBarcode('scanner_input_2')"/>
        <vxml:if cond = "barcodeTitle ! ="">
            Bar code scanned is <vxml:value expr = "barcodeTitle"/>
        <vxml:else/>
            Bar code scanned is not recognized. Please try again.
            <vxml:assign name = "input2NeedsRestart"expr = "true"/>
        </vxml:if>
    </vxml:block>
</vxml:form>
```

Note that if the "input2NeedsRestart flag is set, it means that the original form should be started over.

```
<vxml:form id = "scannerform_script_hidden_done">
    <vxml:block>
        <vxml:if cond = "input2NeedsRestart = = true>
            <vxml:assign name = "input2NeedsRestart" expr =
"false"/>
            <vxml:value>
        </vxml:if>
        <vxml:return/>
    <vxml:block>
</vxml:form>
```

The following resets the document loading flag.

```
<script type = "text/javascript">
    done loading=true;
</script>
<ev:listener ev:event = "vxmldone" ev:handler =
"#scannerform_javascritpt_hidden_done"
ev:observer = "scanner_input_hidden" ev:propagate = "stop"/>
</head>
<body>
    <p>Click in the field and scan barcode, say done when
    finisted:</pr></br>
    <input type = "text" id = "scanner_input_1" onfocus =
"this.select( )" ev:event = "focus"
ev:handler = #scannerform_voice"/ >
```

Note in the following that all of the textual content of an input field is selected on focus. This helps ensure that each scan the entire content of the graphical input field is replaced not merely appended.

```
<p>click in the field and scan a barcode, we will detect when
finisted:</p></br>
    <input type = "text" id = "scanner_input_2" onfocus=
"this.select( )"ev:event="focus"
        ev:handler = "#scannerform_script_focus"/>
    input type = "hidden" id = "scanner_input_hidden"
    ev:event="focus"
    ev:handler = #scannerform_script_hidden_focus"/>
<body>
<html>.
```

Figure 3:
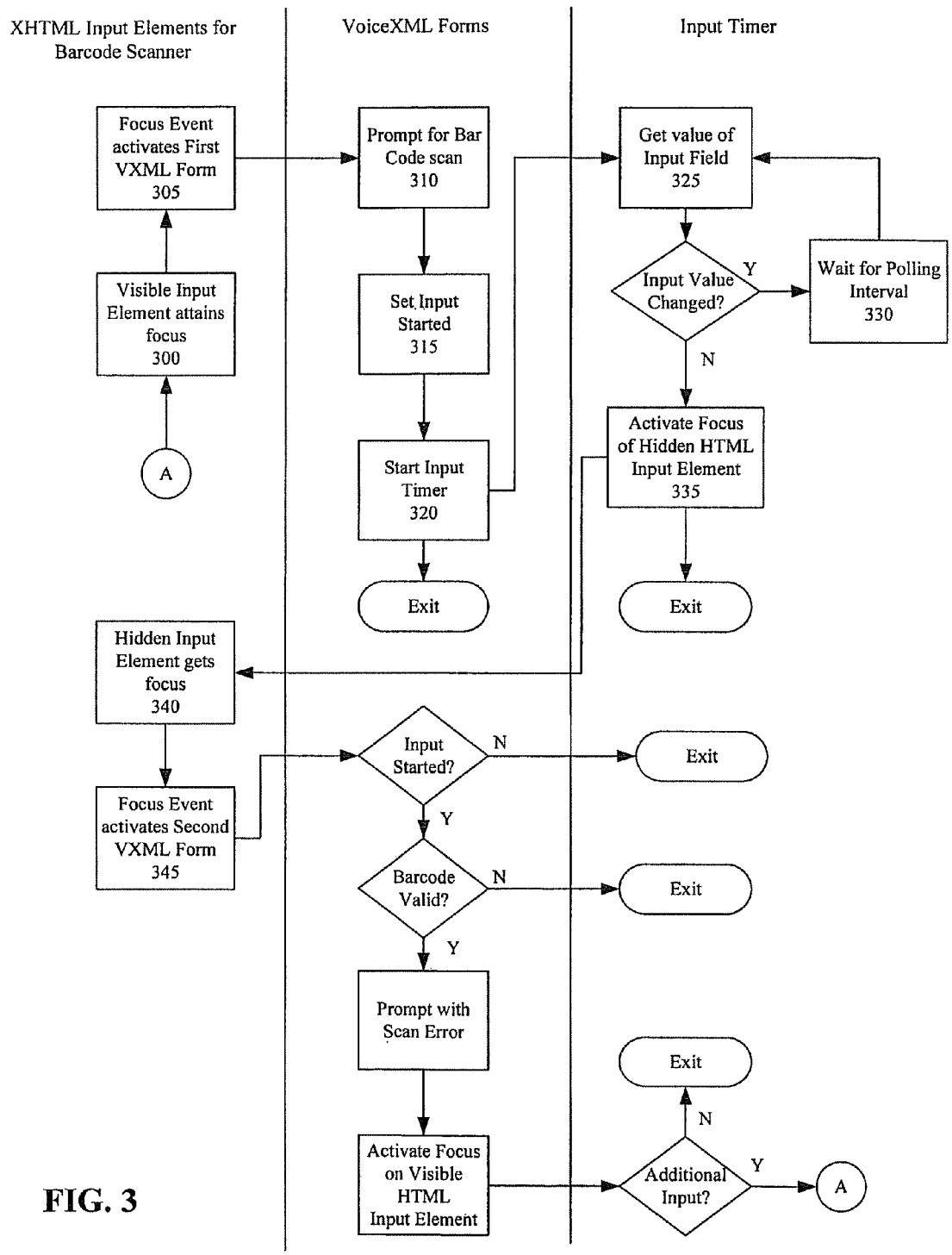
FIG. 3 is a flowchart of a method for inputting graphical data into a graphical input field according to another embodiment of the present invention.

FIG. 3 is flowchart that illustrates the operative features of the voice-form module 28 of the system 20 as implemented with the above-described scripts instructions. The input of graphical data begins at step 300 in which an input of graphical data via a graphical input device is initiated. This illustratively begins with the attainment of focus of the visible graphical input field into which graphic data is to be inputted. As will be readily understood by those of ordinary skill in the art, focus denotes that mechanism by which input is directed toward an event-enabled object. In the current context, the event is the initiation of input of graphic data via the graphical input device 22, and the event-enabled object is the graphic input field into which the graphic data is to be inputted. The event, at step 305, activates the first voice-form function 30. Optionally, the system 20 prompts the user at step 310 to scan in a barcode and a set input operation is started at step 315.

The timing function is started at step 320, and at step 325 an initial value of the visible graphical input field is captured. At step 315, the timing function intermittently compares the value of the graphic input field over time to determine whether the value is changing. Changing values indicate the ongoing input of graphical data, which prompts the system 20 to continue waiting at step 330 for completion. When the value ceases changing, indicating that input is complete, focus of the hidden graphical input field is activated at step 335. The hidden graphical input field attains focus accordingly at step 340. This event illustratively actuates the second voice-form function 32 at step 345. If the barcode is valid, the process is complete. Otherwise, the user is prompted at step 350 to re-initiate the input of graphical data in the event that the data was inputted incorrectly. If there are additional graphical input fields into which graphical data is to be inputted, the process begins anew at step 350.

The system 20 can be incorporated in a multimodal application for which it would otherwise be difficult to determine when the entry of data into an input field had been completed, at least without the completion being indicated by the user's manually exiting out of the input field. Accordingly, the system 20 allows a user to present graphical data to the input device 22, and, in a hands-free mode, the graphical data will be entered field-by-field without the user having to facilitate entry by manually indicating completion after each input field has been filed. Thus, the system can enable the use of I/O devices that heretofore would have been difficult to incorporate into a device such as a hand-held barcode scanner, a PDA, or similar device.

Figure 4:
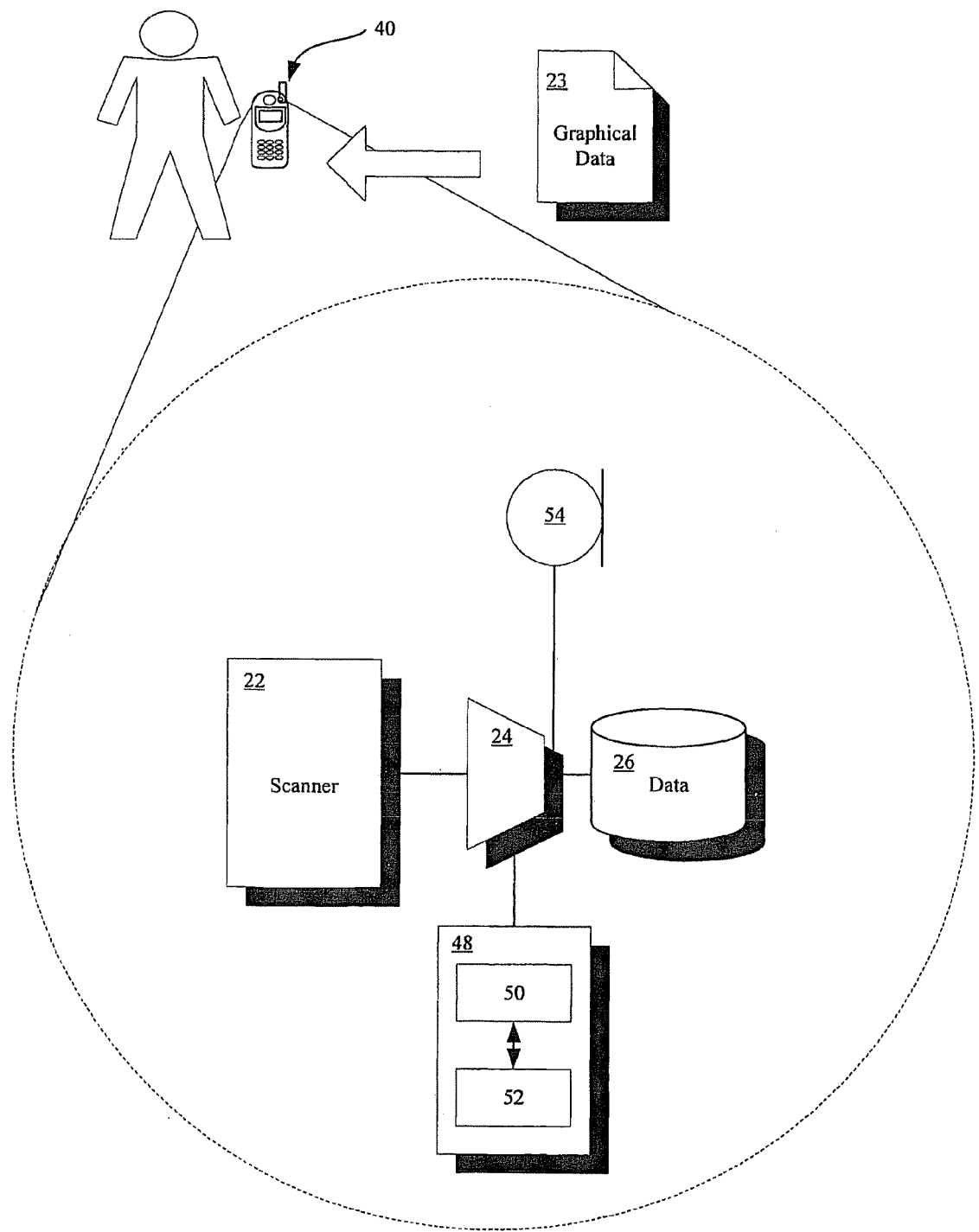
FIG. 4 is a schematic diagram of a system for inputting graphical data into a graphical input field according to yet another embodiment of the present invention.

FIG. 4 is a schematic diagram of a system 400 according to an alternate embodiment of the present invention. The system 400 includes the graphical input device 22 for inputting graphical data into a graphical input field as described above. The system also includes the processor 22 connected to the graphical input device 22 as well as the memory 26 connected to the processor as also described above. The system 400 also optionally includes a text-to-speech (TTS) processor and voice transducer 52. The system 400, however, contains an alternate voice-form module 48 distinct from the one described above.

In this alternate embodiment, the voice-form module 48 includes a user-prompt module 50 that prompts the user to indicate when the inputting of graphical data has been completed. The voice-form module 48 further includes a speech recognition module 52 that recognizes at least one predefined user utterance indicating that the inputting of graphical data into a graphical input field has been completed. In operation, the voice-form module 48 determines that the inputting of graphical data into the graphical input field has been completed based upon a speech utterance recognized by the speech recognition module.

The voice-form module 48 illustratively includes the following scripts-based code for prompting a user to scan in a bar code and utter the word "finished" when this has been done.

```
<vxml:form id = "scannerform_voice">
    <vxml:field name = "waitforscan">
        <vxml:prompt> Please scan a bar code and
    say done when finished.</vxml>
        <vxml:grammar>
            <![CDATA[
                #JSGF V1.0;
                grammar finished;
                public<finished> = done | finished;
            ]]>
        </vxml:grammar>
        <vxml:filled>
            <vxml:var   name    =   "barcodeTitle"
    expr="lookupBarcode('scanner_input_1')"/>
            <vxml:if cond = "barcodeTitle !"">
                Bar code scanned is <vxml:value expr =
                "barcodeTitle"/>
                <vxml:assign
    name    =
    "document.getElementById('scanner_input_1').value"expr  =
    "barcodeTitle"/>
            <vxml:else/>
                Bar code scanned is not recognized. Please try again
                <vxml:value
    expr = "document.getElementById('scanner_input_1').select( )"/>
                <vxml:clear/>
            <vxml:if/>
        </vxml:filled>
    </vxml:field>
</vxml:form>
```

Figure 5:
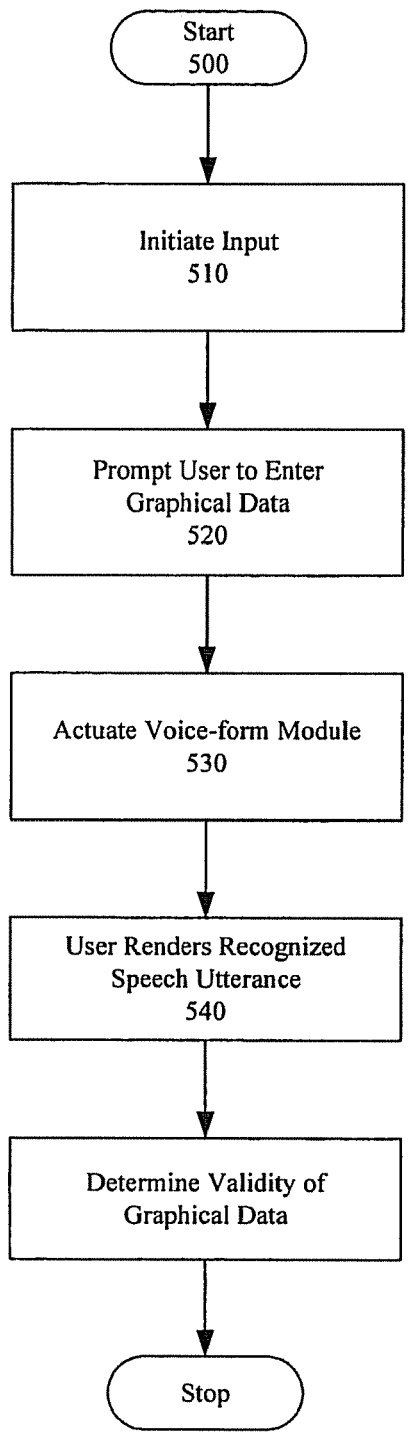
FIG. 5 is a flowchart of a method for inputting graphical data into a graphical input field according to still another embodiment of the present invention

An additional method 500 according to yet another embodiment of the present invention is illustrated by the flowchart in FIG. 5. The method 500 includes initiating an input of graphical data via a graphical input device into the graphical input field at step 510. In response to the initiation, a user is prompted to scan in barcode data at step 520. The method 500 further includes actuating a voice-form module, at step 530, in response to initiating the input of graphical data into the graphical input field. The voice form causes a determination of whether the input of graphical data into the graphical input field has been completed. This is done in response to the user to rendering a pre-selected speech utterance using a recognized word or phrase indicating the completion of the inputting at step 540. The method further includes at step 550 determining whether the inputted graphical data constitutes valid graphical data by having a value that is included in a pre-defined set of valid graphical data values.

Although in both embodiments the voice-form module is illustratively implemented as a series of computer-readable instructions, it will be readily understood by those of ordinary skill in the art that the described functions alternately can be accomplished with dedicated circuitry or a combination of computer-based instructions and dedicated circuitry. Accordingly, it is to be understood that the present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

That claimed is:

1. A system for inputting graphical data into a graphical input field, the system comprising:
    a processor;
    a graphical input device for inputting the graphical data into the graphical input field; and
    a computer-readable medium having stored thereon instructions for causing the processor to implement a voice-form function that is actuated responsive to an initial presentation graphical data to the graphical input device, the graphical input field comprising a hidden input field to avoid contents of the graphical input field being altered inadvertently, wherein the actuating of the voice-form function comprises:
        actuating a first voice-form function for capturing an initial value corresponding to the graphical input field, the first voice-form function subsequently initiating a timing function for polling the graphical input field at a predefined interval to determine at least one subsequent value corresponding to the graphical input field in order to determine whether the input of graphical data into the graphical input field is complete; and
        actuating a second voice-form function based upon a final value corresponding to the graphical input field, the second voice-form function determining whether the final value corresponding to the graphical input field is contained within a predefined set of valid values, wherein a user is prompted to reenter a graphical data value to the graphical input device if the graphical data value inputted into the graphical input field is a graphical data value not contained in the predefined set of valid values.

2. The system of claim 1, further comprising a voice input/output device for receiving voice input and providing voice-based user prompts in response to the inputting of the graphical data.

3. The system of claim 2, further comprising a speech recognition component for recognizing voice input received via the voice input/output device.

4. The system of claim 1, wherein the voice form-function further causes a subsequent input of graphical data if the input of graphical data is complete and if the graphical data includes at least a first and a second graphical data element.

5. The system of claim 1, wherein the voice-form function further causes a determination of whether the graphical data inputted into the graphical input field is a graphical data element whose value is contained in a predefined set of valid graphical data element values.

6. The system of claim 5, wherein the voice-form function further causes a user to be prompted to represent graphical data to the graphical input device if the graphical data inputted into the graphical input field is a graphical data element whose value is not contained in the predefined set of valid graphical data element values.

7. The system of claim 1, wherein actuating the voice-form function causes a user prompt instructing the user to indicate when the inputting of graphical data into the graphical input field is completed.

8. A non-transitory computer-readable storage medium, the storage medium comprising computer instructions for:
    initiating an input of graphical data via a graphical input device into the graphical input field; and
    actuating a voice-form function in response to initiating the input of graphical data into the graphical input field, the graphical input field comprising a hidden input field to avoid contents of the graphical input field being altered inadvertently, actuating the voice-form function comprising:
        actuating a first voice-form function for capturing an initial value corresponding to the graphical input field, the first voice-form function subsequently initiating a timing function for polling the graphical input field at a predefined interval to determine at least one subsequent value corresponding to the graphical input field in order to determine whether the input of graphical data into the graphical input field is complete; and
        actuating a second voice-form function based upon a final value corresponding to the graphical input field, the second voice-form function determining whether the final value corresponding to the graphical input field is contained within a predefined set of valid values, wherein a user is prompted to reenter a graphical data value to the graphical input device if the graphical data value inputted into the graphical input field is a graphical data value not contained in the predefined set of valid values.

9. The non-transitory computer-readable storage medium of claim 8, wherein the voice form-function further causes a subsequent input of graphical data if the input of graphical data is complete and if the graphical data includes at least a first and a second graphical data element.

10. The non-transitory computer-readable storage medium of claim 8, wherein the voice-form function further causes a determination of whether the graphical data inputted into the graphical input field is a graphical data element whose value is contained in a predefined set of valid graphical data element values.

11. The non-transitory computer-readable storage medium of claim 8, wherein the voice-form function causes a user prompt instructing the user to indicate when the inputting of graphical data into the graphical input field is completed.

* * * * *